(12) United States Patent
Oh et al.

(10) Patent No.: US 12,519,126 B2
(45) Date of Patent: Jan. 6, 2026

(54) SECONDARY BATTERY

(71) Applicant: Samsung SDI Co., Ltd., Yongin-si (KR)

(72) Inventors: Dae Sik Oh, Yongin-si (KR); Sang Young Jin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/719,521

(22) Filed: Dec. 18, 2019

(65) Prior Publication Data

US 2020/0251692 A1    Aug. 6, 2020

(30) Foreign Application Priority Data

Jan. 31, 2019    (KR) .................. 10-2019-0012371

(51) Int. Cl.
*H01M 10/0525* (2010.01)
*H01M 50/103* (2021.01)

(52) U.S. Cl.
CPC ...... *H01M 10/0525* (2013.01); *H01M 50/103* (2021.01)

(58) Field of Classification Search
None
See application file for complete search history.

(56) References Cited

U.S. PATENT DOCUMENTS

| | | | |
|---|---|---|---|
| 8,748,031 B2 | 6/2014 | Kim et al. | |
| 9,583,742 B2 | 2/2017 | Munenaga et al. | |
| 9,905,369 B2 | 2/2018 | Ioka et al. | |
| 9,966,579 B2 | 5/2018 | Lee et al. | |
| 10,224,519 B2 | 3/2019 | Kawada et al. | |
| 11,050,102 B2 | 6/2021 | Wakimoto | |
| 2008/0070100 A1 | 3/2008 | Jang et al. | |
| 2011/0300423 A1* | 12/2011 | Lee ........................ | H01M 50/10 |
| | | | 429/94 |
| 2012/0052371 A1 | 3/2012 | Kim et al. | |
| 2012/0189904 A1* | 7/2012 | Kawada .............. | H01M 50/169 |
| | | | 429/163 |

(Continued)

FOREIGN PATENT DOCUMENTS

| | | |
|---|---|---|
| CN | 102623744 A | 8/2012 |
| CN | 102800888 A | 11/2012 |

(Continued)

OTHER PUBLICATIONS

EPO Extended Search Report dated May 19, 2020, for corresponding European Patent Application No. 20151695.2 (7 pages).

(Continued)

*Primary Examiner* — Dustin Q Dam
(74) *Attorney, Agent, or Firm* — Womble Bond Dickinson (US) LLP

(57) ABSTRACT

A secondary battery includes: an electrode assembly; a case accommodating the electrode assembly; and a cap assembly coupled to the case to seal the case, and the case includes a bottom portion, long side portions bent and extended from the bottom portion, a first short side portion bent and extended from the bottom portion, and second short side portions bent and extended from the long side portions, and the first short side portion and the second short side portions are connected to one another to define a short side portion.

14 Claims, 14 Drawing Sheets

(56) References Cited

U.S. PATENT DOCUMENTS

| | | | | |
|---|---|---|---|---|
| 2012/0301779 A1* | 11/2012 | Munenaga | ........... | H01M 50/103 |
| | | | | 429/178 |
| 2013/0149563 A1 | 6/2013 | Lee et al. | | |
| 2016/0372717 A1* | 12/2016 | Noda | ................... | H01M 50/124 |
| 2017/0149024 A1* | 5/2017 | Park | ...................... | H01M 50/10 |
| 2017/0149030 A1 | 5/2017 | Lee et al. | | |
| 2019/0036088 A1* | 1/2019 | Wakimoto | ............. | H01G 11/82 |

FOREIGN PATENT DOCUMENTS

| | | |
|---|---|---|
| CN | 102903864 A | 1/2013 |
| CN | 103531743 A | 1/2014 |
| CN | 105474428 A | 4/2016 |
| CN | 106803553 A | 6/2017 |
| EP | 2528132 A2 | 11/2012 |
| EP | 2528132 A3 | 12/2014 |
| EP | 3174126 A1 | 5/2017 |
| EP | 3726603 A1 | 10/2020 |
| JP | H0654660 B2 * | 7/1994 |
| JP | H06-321235 A | 11/1994 |
| JP | 2001-236929 A | 8/2001 |
| JP | 2002-198011 A | 7/2002 |
| JP | 2012-133913 A | 7/2012 |
| JP | 2012-169255 A | 9/2012 |
| JP | 2013-008665 A | 1/2013 |
| JP | 2013-125737 A | 6/2013 |
| JP | 2013-235730 A | 11/2013 |
| JP | 6050606 B2 | 12/2016 |
| JP | 2017-200707 A | 11/2017 |
| JP | 2019-29218 A | 2/2019 |
| JP | 2019-029218 A | 2/2019 |
| KR | 10-1155889 B1 | 6/2012 |
| KR | 10-2013-0065291 A | 6/2013 |
| KR | 10-2014-0004835 A | 1/2014 |
| KR | 10-1704981 B1 | 2/2017 |
| KR | 10-2017-0060941 A | 6/2017 |
| WO | WO 2013/093965 A1 | 6/2013 |
| WO | WO 2014/002598 A1 | 1/2014 |
| WO | WO 2016/203342 A1 | 12/2016 |

OTHER PUBLICATIONS

EPO Extended European Search Report dated Sep. 18, 2020, corresponding to European Patent Application No. 20163787.3 (7 pages).

Extended European Search Report for corresponding European Patent Application No. 20159852.1, dated Aug. 18, 2020, 6 pages.

U.S. Office Action dated May 26, 2021, issued in U.S. Appl. No. 16/719,501 (8 pages).

U.S. Office Action dated Jun. 10, 2021, issued in U.S. Appl. No. 16/719,578 (7 pages).

U.S. Advisory Action dated Jan. 12, 2022, issued in U.S. Appl. No. 16/719,501 (3 pages).

U.S. Advisory Action dated Jan. 12, 2022, issued in U.S. Appl. No. 16/719,578 (3 pages).

Office Action, with English translation, dated Feb. 21, 2022, for related Chinese Application No. CN 202010039940.7 (16 pages).

Office Action for related U.S. Appl. No. 16/719,501, dated Feb. 7, 2022 (5 pages).

Notice of Allowance for related U.S. Appl. No. 16/719,578, dated Feb. 14, 2022 (7 pages).

Office Action dated Mar. 2, 2022 in European Patent Application No. 20163787.3 (4 pages).

U.S. Notice of Allowance from U.S. Appl. No. 16/719,578, dated May 12, 2022, 7 pages.

U.S. Notice of Allowance dated Jun. 8, 2022, issued in U.S. Appl. No. 16/719,501 (7 pages).

U.S. Final Office Action dated Nov. 1, 2021, issued in U.S. Appl. No. 16/719,501 (5 pages).

U.S. Final Office Action dated Nov. 1, 2021, issued in U.S. Appl. No. 16/719,578 (5 pages).

Chinese Notice of Allowance dated Jun. 13, 2023, issued in corresponding Chinese Patent Application No. 202010039940.7 (7 pages, including English translation).

Korean Notice of Allowance dated Nov. 27, 2024, issued in corresponding Korean Patent Application No. 10-2019-0012371 (6 pages).

* cited by examiner

SECONDARY BATTERY

CROSS-REFERENCE TO RELATED APPLICATION

This application claims priority to and the benefit of Korean Patent Application No. 10-2019-0012371, filed on Jan. 31, 2019 in the Korean Intellectual Property Office, the entire content of which is herein incorporated by reference.

BACKGROUND

1. Field

Aspects of embodiments of the present invention relate to a secondary battery.

2. Description of the Related Art

A battery may be classified as a prismatic type, a cylindrical type, a pouch type, etc., according to the shape of a can, or case. A prismatic or cylindrical battery may be manufactured by inserting an electrode assembly having a positive electrode, a negative electrode, and a separator into a metal can and sealing the electrode assembly, while a pouch type battery may be manufactured by enclosing an electrode assembly using an aluminum foil coated with an insulator.

Traditional battery can manufacturing methods may include a deep drawing process, an impact process, and so on. In an example, the deep drawing process is performed such that a sheet-shaped metal plate is placed on a molding die, and punching operations are performed on the metal plate about ten times using a punch, thereby completing the can. In another example, the impact process is performed such that a slug in the form of a billet is placed on a molding die and a strong punching operation is performed on the slug about one time using a punch, thereby completing the can. The impact process can reduce the number of processing steps, thereby lowering the manufacturing cost.

However, the conventional deep drawing process and the conventional impact process are both limited in reducing a can thickness due to the respective manufacturing process characteristics and may have a large deviation in the thickness of the can according to the area of the can. In addition, the conventional deep drawing process and the conventional impact process are problematic in that the manufacturing cost of the battery can is quite high.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a secondary battery may have substantially no thickness deviation in various areas of a can by reducing the thickness of the can and increasing dimensional accuracy.

According to another aspect of embodiments of the present invention, a secondary battery may have increased capacity relative to the battery size and may have reduced manufacturing cost by minimizing or reducing the thickness of the can.

According to one or more embodiments of the present invention, a secondary battery includes: an electrode assembly; a case accommodating the electrode assembly; and a cap assembly coupled to the case to seal the case, wherein the case includes a bottom portion, long side portions bent and extended from the bottom portion, a first short side portion bent and extended from the bottom portion, and second short side portions bent and extended from the long side portions, and the first short side portion and the second short side portions are connected to one another to define a short side portion.

The first short side portion may have a shape of a triangle, a rectangle, a trapezoid, a semicircle, or a semi-ellipse, and the second short side portions may be configured to correspond with the first short side portion.

The second short side portions may be connected to each other.

The short side portion may include welding portions, and the welding portions may include a first welding portion located between the first short side portion and the second short side portions, and a second welding portion located between the second short side portions.

The first welding portion and the second welding portion may be connected to each other.

The first welding portion may be shaped as a straight line having at least one vertex, and the second welding portion may be shaped as a straight line extending from the first welding portion.

The first welding portion may have a vertex angle in a range from 80 degrees to 100 degrees.

The second welding portion may be extended from a vertex or a side of the first welding portion.

The first welding portion may be shaped as a curve, and the second welding portion may be shaped as a straight line extending from the first welding portion.

A welding portion of the welding portions may include a butt joint structure, a lap joint structure, an overlay joint structure, or an edge joint structure.

The butt joint structure may be configured to provide the welding portion in a state in which an end of the first short side portion and an end of the second short side portions are in contact with each other.

The lap joint structure may be configured to provide the welding portion in a state in which the first short side portion and the second short side portions overlap with each other.

The overlay joint structure may be configured to provide the welding portion in a state in which a cover plate is attached to the first short side portion and the second short side portions.

A welding portion of the welding portions may include multiple welding beads, and the multiple welding beads include circular peripheries facing the bottom portion.

The first short side portion may extend from both end portions of the bottom portion, the second short side portions may extend from both ends of the long side portions, and the short side portion may be defined on both sides of the bottom portion and the long side portions.

As described above, in a secondary battery according to one or more embodiments of the present invention, the thickness of a can may be reduced, and there may be substantially no thickness deviation in each area of the can by increasing dimensional accuracy. In some examples, a can having a top opening may be provided by performing blanking and/or notching, bending, and welding processes on a metal plate. In such a way, the can may be manufactured using a metal plate through bending and welding processes, rather than a conventional process, e.g., deep drawing or impacting, thereby determining the thickness of the can depending on the thickness of the metal plate. Therefore, the can may have a reduced thickness, compared to the conventional can, and may have a uniform thickness in various areas of the can (e.g., a bottom portion, long side portions, and short side portions). Accordingly, when a cap assembly is welded to the can, the cap assembly may uniformly contact corresponding areas of the can, thereby preventing or substantially preventing a welding failure from occurring to the cap assembly.

In addition, in the secondary battery according to one or more embodiments of the present invention, a capacity relative to the battery size may be increased and the manufacturing cost may be reduced by minimizing or reducing the thickness of a can. That is, as described above, the metal plate may be bent and welded to provide the can, thereby allowing the can to have a reduced thickness, compared to a conventional can. Accordingly, the secondary battery may have a larger charge/discharge capacity than a conventional secondary battery, even if the secondary battery according to the present invention has a same size as the conventional battery.

DESCRIPTION OF REFERENCE NUMERALS

Figure 1:
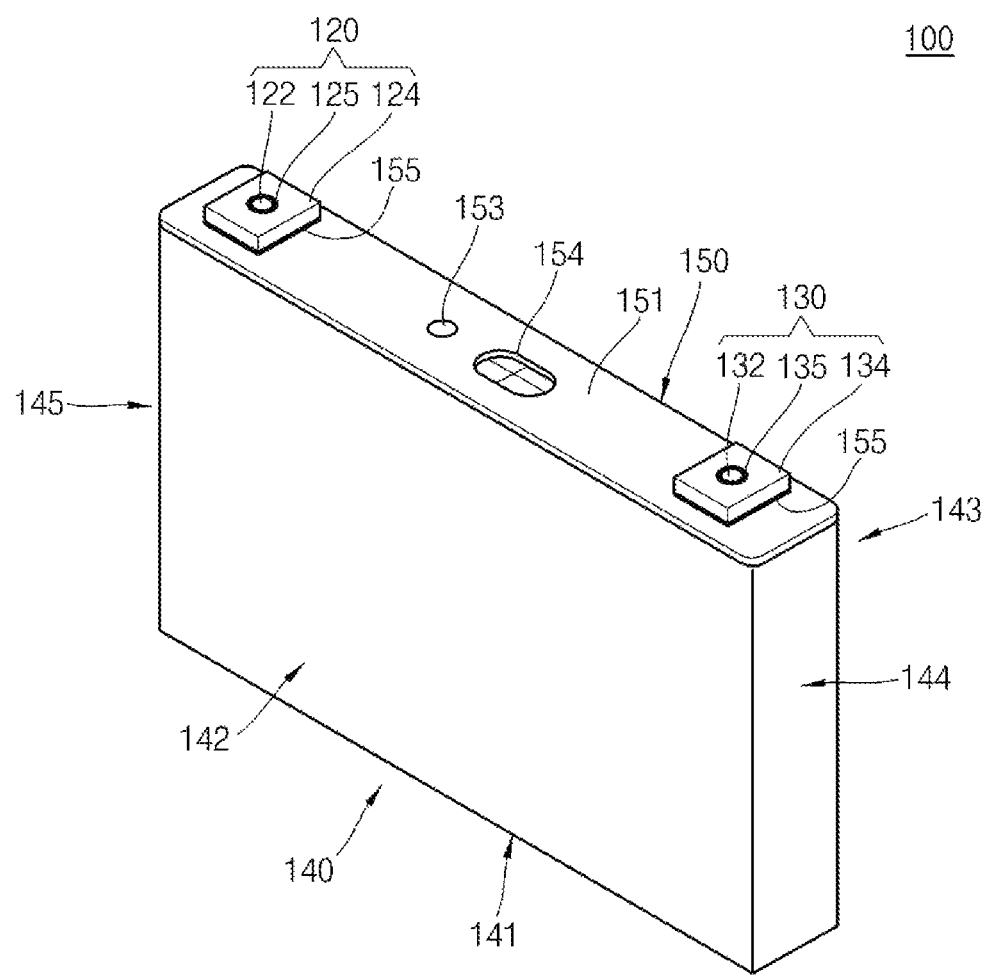
FIG. 1 is a perspective view illustrating a secondary battery according to an example embodiment of the present invention.

| | |
|---|---|
| 100, 200: Secondary battery | 110: Electrode assembly |
| 120: First terminal | 130: Second terminal |
| 140, 340: Can | 140A: Metal plate |
| 141: Bottom portion | 142, 143: Long side portion |
| 144, 145: Short side portion | 146: (Main) Welding portion |
| 147: Opening | 150: Cap assembly |

DETAILED DESCRIPTION

Herein, some example embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, it is to be understood that when an element A is referred to as being "connected to" an element B, the element A may be directly connected to the element B or one or more intervening elements C may be present, and the element A and the element B may be indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

The term "welding portion" used throughout this specification may be referred to as a temporary welding portion and/or a welding portion in some cases, which is for representing the welding sequence and function but is not intended to limit the invention. In addition, the term "welding" as used herein mainly means laser welding, and examples of a laser used for welding may include, but are not limited to, $CO_2$ laser, fiber laser, disk laser, semiconductor laser, and/or yttrium aluminum garnet (YAG) laser. In addition, the terms "second short side portion" and "third short side portion" may be referred to as second short side portions, in some cases.

Unless otherwise defined, all terms used herein (including technical or scientific terms) have the same meanings as those generally understood by those skilled in the art to which the inventive concept pertains. Such terms as those defined in a generally used dictionary are to be interpreted as having meanings equal to the contextual meanings in the relevant field of art, and are not to be interpreted as having idealized or excessively formal meanings unless clearly defined herein.

FIG. 1 is a perspective view illustrating a secondary battery according to an example embodiment of the present invention. In the example shown in FIG. 1, a secondary battery 100 may include an electrode assembly 110 (110 and 210 in the examples shown in FIGS. 2A and 2B), a first terminal 120, a second terminal 130, a can, or case, 140, and a cap assembly 150.

In some examples, the can 140 may be provided by blanking and/or notching, bending, and welding a metal plate, and may have a substantially hexahedral shape having an opening through which the electrode assembly 110 is inserted and placed and the cap assembly 150 is mounted. In some examples, the can 140 may include a rectangular bottom portion 141 having long sides and short sides, long side portions 142 and 143 bent and extended from the respective long sides of the bottom portion 141 to the cap assembly 150, and short side portions 144 and 145 extended from the respective short sides of the bottom portion 141 and the long side portions 142 and 143.

In FIG. 1, the can 140 and the cap assembly 150 assembled to each other are illustrated, such that the opening, which is a substantially opened part of a region corresponding to the cap assembly 150, is not illustrated in FIG. 1. In an embodiment, the interior surface of the can 140 is subjected to insulation treatment such that the can 140 is insulated from the electrode assembly 110, the first terminal 120, the second terminal 130, and the cap assembly 150.

Figure 2A:
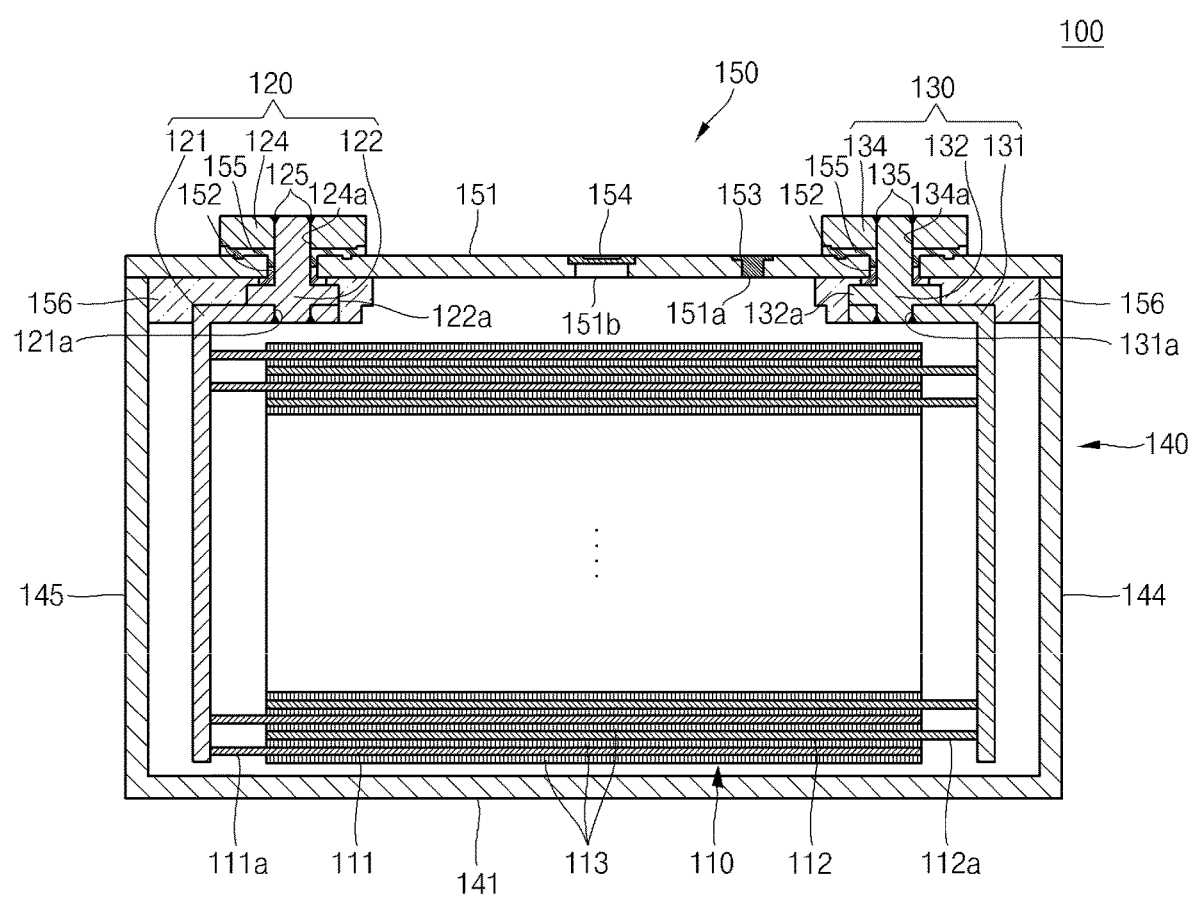
FIGS. 2A and 2B are cross-sectional views illustrating secondary batteries according to example embodiments of the present invention.
Figure 2B:
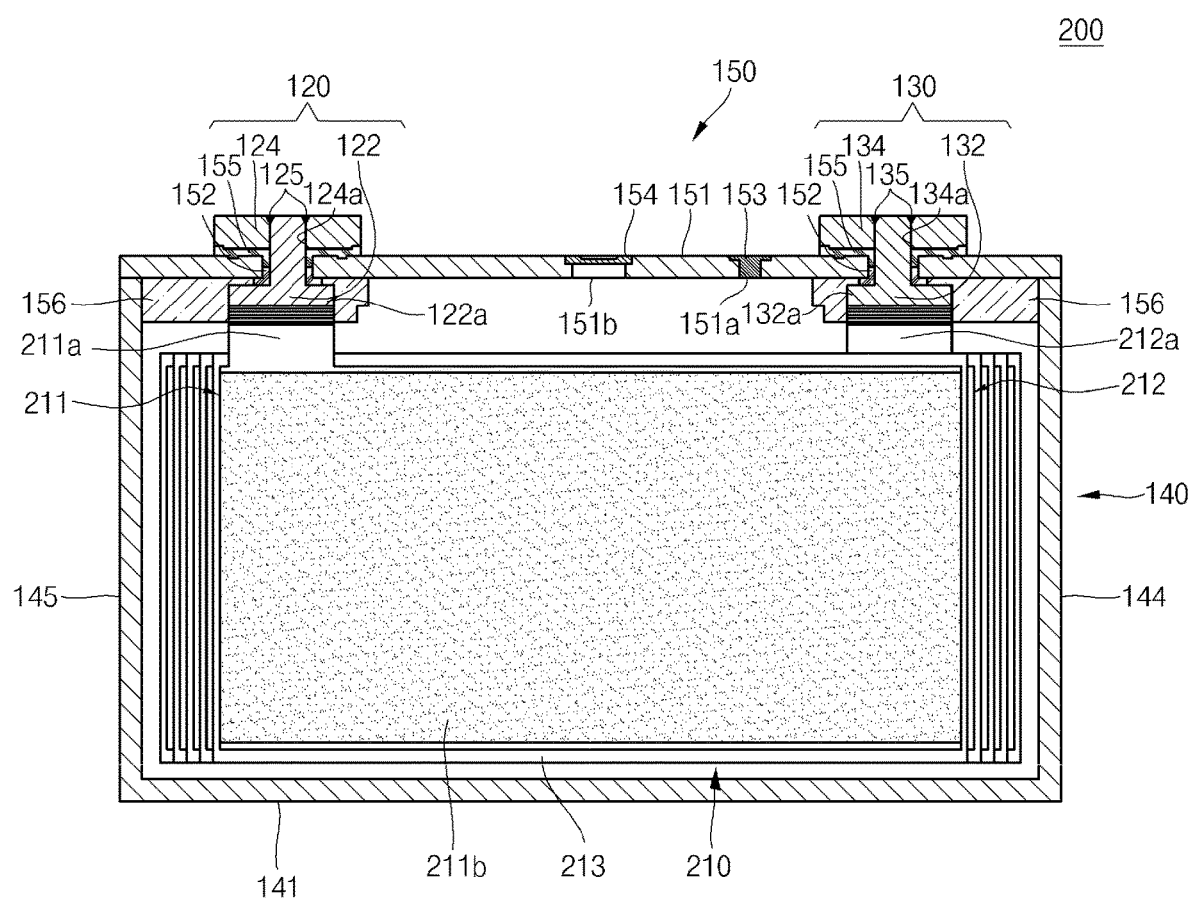

FIGS. 2A and 2B are cross-sectional views illustrating secondary batteries 100 and 200 according to example embodiments of the present invention. In the example shown in FIG. 2A, the secondary battery 100 may include the electrode assembly 110 having a winding axis extending in a horizontal direction (i.e., in a direction substantially parallel with a lengthwise direction of the cap assembly 150). In the example shown in FIG. 2B, the secondary battery 200 may include an electrode assembly 210 having a winding axis extending in a vertical direction (i.e., in a direction substantially perpendicular to the lengthwise direction of the cap assembly 150). In some examples, the electrode assembly may be a stacked electrode assembly, rather than a wound electrode assembly.

The secondary battery 100 shown in FIG. 2A will now be described. The electrode assembly 110 may be formed by winding or stacking a stacked structure including a first electrode plate 111, a separator 113, and a second electrode plate 112, which are thin plates or layers. In some examples, the first electrode plate 111 may operate as a negative electrode and the second electrode plate 112 may operate as a positive electrode, or vice versa. In some examples, the first electrode plate 111 may be formed by coating a first active material, such as graphite or carbon, on a first electrode collector made of a metal foil, such as copper, a copper alloy, nickel, or a nickel alloy, and may include a first uncoated portion 111a that is not coated with the first active material. In some examples, the second electrode plate 112 may be formed by coating a second active material, such as a transition metal oxide, on a second electrode collector made of a metal foil, such as aluminum or an aluminum alloy, and may include a second uncoated portion 112a that is not coated with the second electrode material. In some examples, the separator 113, which is located between the first and second electrode plates 111 and 112, may prevent or substantially prevent short circuits between the first and second electrode plates 111 and 112, and may allow lithium ions to move. In an embodiment, the separator 113 may include polyethylene, polypropylene, or a composite film of polyethylene and polypropylene. In an embodiment, the separator 113 may be replaced by an inorganic solid electrolyte, such as a sulfide-based compound, an oxide-based compound, or a sulphate compound, such as to not necessitate a liquid- or gel-phase electrolyte solution. The first terminal 120 and the second terminal 130 electrically connected to the first electrode plate 111 and the second electrode plate 112, respectively, are located at opposite ends of the electrode assembly 110. In some examples, the electrode assembly 110 may be accommodated in the can 140 with an electrolytic solution. In some examples, the electrolytic solution may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. In some examples, if the inorganic solid electrolyte is used, the electrolytic solution may be omitted.

The first terminal 120 may be made of a metal and may be electrically connected to the first electrode plate 111. In some examples, the first terminal 120 may include a first collector plate 121, a first terminal pillar 122, and a first terminal plate 124. In some examples, the first collector plate 121 may be brought into contact with the first uncoated portion 111a protruding at an end of the electrode assembly 110. The first collector plate 121 may be welded to the first uncoated portion 111a. In some examples, the first collector plate 121 may be substantially in an inverted L-shaped ("[") configuration and may have a terminal hole 121a located in a top portion thereof. In some examples, the first terminal pillar 122 may be inserted into the terminal hole 121a, followed by riveting and/or welding. In some examples, the first collector plate 121 may be made of copper or a copper alloy. In some examples, the first terminal pillar 122 penetrates the cap plate 151 to be described later and is electrically connected to the first collector plate 121 under the cap plate 151. In addition, in some examples, while the first terminal pillar 122 is upwardly protruded and extended to an upper portion of the cap plate 151 by a length (e.g., a predetermined length), a flange 122a may be located below the cap plate 151 to prevent or substantially prevent the first terminal pillar 122 from being dislodged from the cap plate 151. In an embodiment, a portion of the first terminal pillar 122 positioned below the flange 122a is fitted into the first terminal hole 121a of the first collector plate 121, followed by riveting and/or welding. In some examples, the first terminal pillar 122 may be electrically insulated from the cap plate 151. In some examples, boundary regions of the upwardly exposed first terminal pillar 122 and the first terminal plate 124 may be welded to each other. For example, a laser beam may be supplied to the boundary regions of the upwardly exposed first terminal pillar 122 and the first terminal plate 124 to melt the boundary regions, followed by cooling, thereby welding the boundary regions. The welded regions are designated by reference numeral 125 in FIG. 2A. In an embodiment, a bus bar made of aluminum or an aluminum alloy may be welded to the first terminal plate 124.

The second terminal 130 may also be made of a metal and may be electrically connected to the second electrode plate 112. In some examples, the second terminal 130 may include a second collector plate 131, a second terminal pillar 132, and a second terminal plate 134. In some examples, the second collector plate 131 may be brought into contact with the second uncoated portion 112a protruding at an end of the electrode assembly 110. In some examples, the second collector plate 131 may be substantially in an inverted L-shaped ("]") configuration and may have a terminal hole 131a located in a top portion thereof. In some examples, the second terminal pillar 132 may be inserted into the terminal hole 131a and coupled thereto. In some examples, the first collector plate 121 may be made of, for example, but is not limited to, aluminum or an aluminum alloy. In some examples, the second terminal pillar 132 penetrates the cap plate 151 to be described later and is electrically connected to the second collector plate 131 under the cap plate 151. In addition, in some examples, while the second terminal pillar 132 is upwardly protruded and extended to an upper portion of the cap plate 151 by a length (e.g., a predetermined length), a flange 132a may be located below the cap plate 151 to prevent or substantially prevent the second terminal pillar 132 from being dislodged from the cap plate 151. In an embodiment, a portion of the second terminal pillar 132 positioned below the flange 132a is fitted into the second terminal hole 131a of the second collector plate 131, followed by riveting and/or welding. In an embodiment, the second terminal pillar 132 may be electrically insulated from the cap plate 151. In some examples, the second terminal pillar 132 may be made of aluminum or an aluminum alloy. In an embodiment, the second terminal plate 134 has a hole 134a. In addition, the second terminal plate 134 is coupled to the second terminal pillar 132. That is, the second terminal pillar 132 may be coupled to the hole 134a of the second terminal plate 134. In an embodiment, the second terminal pillar 132 and the second terminal plate 134 may be riveted and/or welded to each other. In some examples, boundary regions of the upwardly exposed second terminal pillar 132 and the second terminal plate 134 may be welded to each other. For example, a laser beam may be supplied to the boundary regions of the upwardly exposed second terminal pillar 132 and the second terminal plate 134 to melt the boundary regions, followed by cooling, thereby welding the boundary regions. The welded regions are designated by reference numeral 135 in FIG. 2A. In an embodiment, a bus bar made of aluminum or an aluminum alloy may be easily welded to the second terminal plate 134. In an embodiment, the second terminal plate 134 may be electrically connected to the cap plate 151. Thus, in an embodiment, the cap plate 151 and the can 140, which will be described below, may have the same polarity as the second terminal 130 (e.g., a positive polarity).

The cap assembly 150 may be coupled to the can 140. In some examples, the cap assembly 150 may include the cap plate 151, a seal gasket 152, a plug 153, a safety vent 154, an upper coupling member 155, and a lower insulating member 156. The cap plate 151 may seal the opening of the case 140, and may be made of the same material as the case 140. In some examples, the cap plate 151 may be coupled to the can 140 by laser welding. In an embodiment, since the cap plate 151 has the same polarity as the second terminal 130, the cap plate 151 and the can 140 may have the same polarity. The seal gasket 152 made of an insulating material may be located between each of the first terminal pillar 122 and the second terminal pillar 132 and the cap plate 151 at a bottom end of the cap plate 151 and may seal regions between each of the first terminal pillar 122 and the second terminal pillar 132 and the cap plate 151. The seal gasket 152 may prevent or substantially prevent external moisture from permeating into the secondary battery 100 or prevent or substantially prevent the electrolyte accommodated in the secondary battery 100 from being effused outside. The plug 153 may seal an electrolyte injection hole 151a of the cap plate 151. In an embodiment, the safety vent 154 may be installed in a vent hole 151b of the cap plate 151 and has a notch configured to be openable at a preset pressure. The upper coupling member 155 may be located between each of the first terminal pillar 122 and the second terminal pillar 132 and the cap plate 151 at a top end of the cap plate 151. In addition, the upper coupling member 155 may closely contact the cap plate 151. In addition, the upper coupling member 155 may also closely contact and the seal gasket 152. In an embodiment, the upper coupling member 155 may insulate the first terminal pillar 122 and the second terminal pillar 132 from the cap plate 151. In some examples, the upper coupling member 155 located in the second terminal pillar 132 may electrically connect the second terminal plate 134 and the cap plate 151 to each other. Accordingly, the second terminal 130 may have the same polarity as the cap plate 151 and the can 140. The lower insulating member 156 may be located between each of the first collector plate 121 and the second collector plate 131 and the cap plate 151 and may prevent or substantially prevent an unnecessary short circuit from being generated. That is, the lower insulating member 156 may prevent or substantially prevent short circuits from being generated between the first collector plate 121 and the cap plate 151 and between the second collector plate 131 and the cap plate 151.

The secondary battery 200 shown in FIG. 2B will now be described. The secondary battery 200 is different from the secondary battery 100 in terms of the construction of the electrode assembly 210 and the connection relationships between the electrode assembly 210 and each of the terminals 120 and 130. A first electrode tab 211a may be positioned between the electrode assembly 210 and a first terminal pillar 122 of a first terminal 120, and a second electrode tab 212a may be positioned between the electrode assembly 210 and a second terminal pillar 132 of a second terminal 130. The first electrode tab 211a may be extended from a top end of the electrode assembly 210 to a bottom end of the first terminal pillar 122 of the first terminal 120 to be electrically connected or welded to a planar flange 122a provided in the first terminal pillar 122. In addition, the second electrode tab 212a may be extended from a top end of the electrode assembly 210 to a bottom end of the second terminal pillar 132 of the second terminal 130 to be electrically connected or welded to a planar flange 132a provided in the second terminal pillar 132. The first electrode tab 211a may be either a first uncoated portion of the first electrode plate 211 of the electrode assembly 210, which is not coated with a first active material 211b, or a separate member connected to the first uncoated portion. Here, the first uncoated portion may be made of the same material as the first electrode plate 211, and the separate member may be one selected from the group consisting of any of nickel, a nickel alloy, copper, a copper alloy, aluminum, an aluminum alloy, and equivalents thereof. In addition, the second electrode tab 212a may be either a second uncoated portion of the second electrode plate 212 of the electrode assembly 210, which is not coated with a second active material, or a separate member connected to the second uncoated portion. Here, the second uncoated portion may be made of the same material as the second electrode plate 212, and the separate member may be one selected from the group consisting of any of aluminum, an aluminum alloy, nickel, a nickel alloy, copper, a copper alloy, and equivalents thereof.

As described above, in an embodiment, since a winding axis of the electrode assembly and terminal axes of the terminals are parallel or horizontal with each other, the electrode assembly has excellent electrolyte impregnation capability when an electrolyte is injected, and internal gases may be rapidly transferred to a safety vent during overcharging to facilitate the safety vent 154 quickly operating. In addition, electrode tabs (uncoated portions or separate members) of the electrode assembly may be directly electrically connected to the terminals, which shortens electrical paths, thereby reducing internal resistance of the secondary battery 100 while reducing the number of components of the secondary battery 100.

In embodiments, cans 140, 340, 440, 540, 640, and 740 manufactured by example methods, which will be described below, may be included in the secondary batteries 100 and 200 shown in FIGS. 1, 2A, and 2B.

Figure 3A:
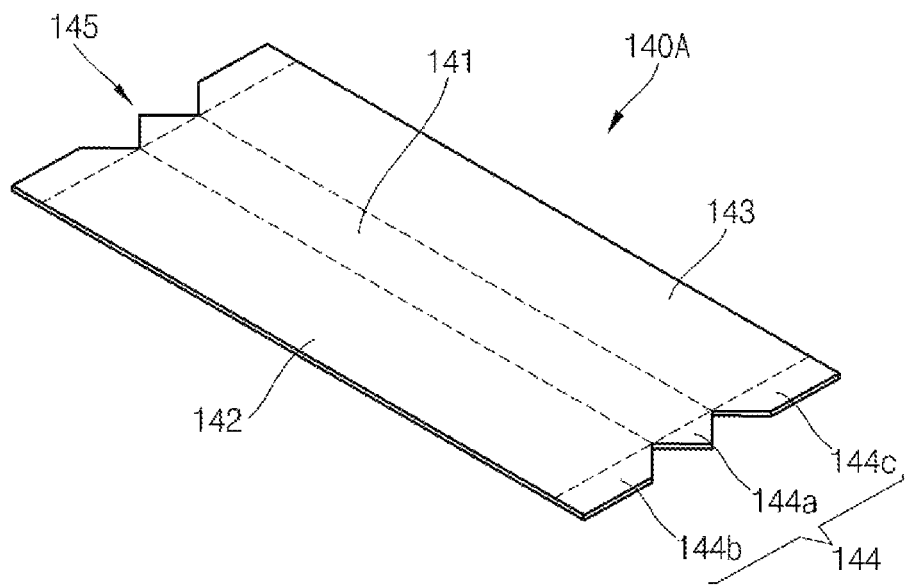
FIGS. 3A to 3C are perspective views illustrating a method for manufacturing a secondary battery according to an example embodiment of the present invention.
Figure 3B:
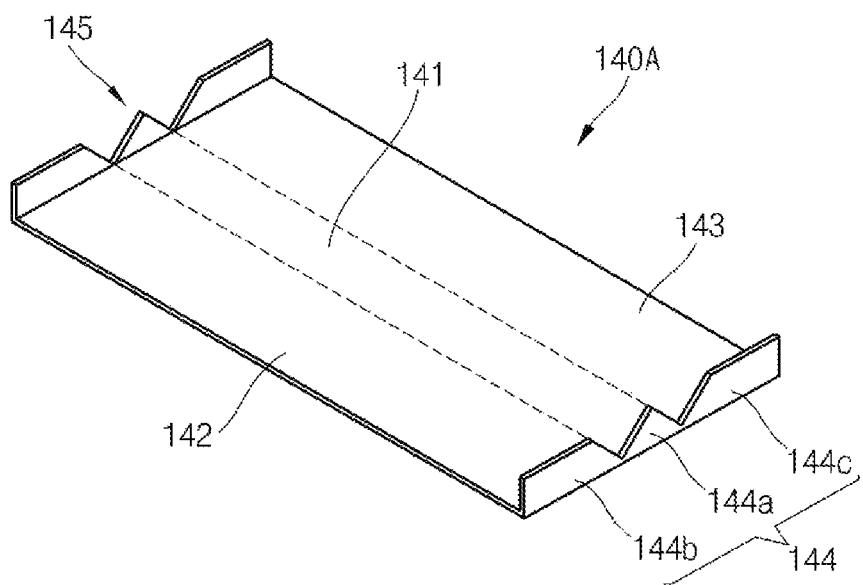
Figure 3C:
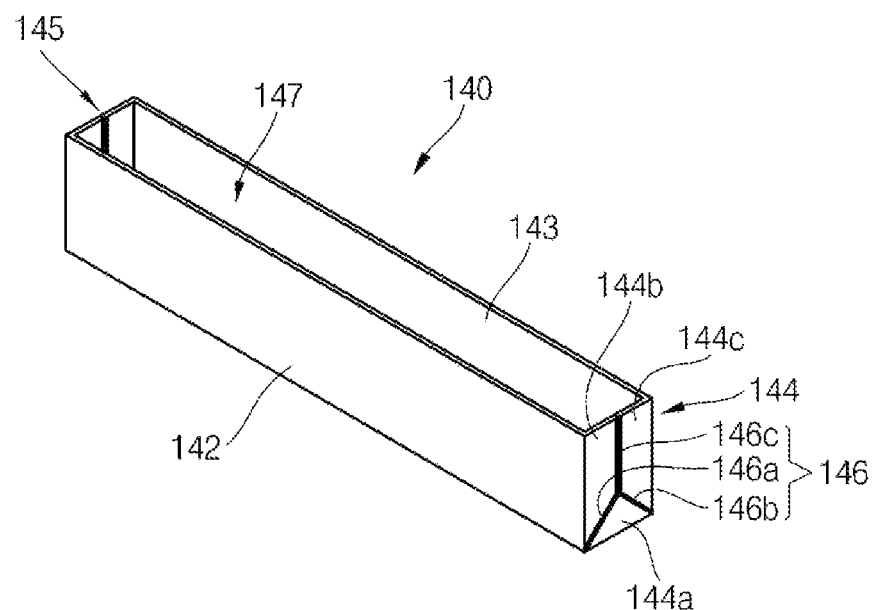

FIGS. 3A to 3C are perspective views illustrating a method for manufacturing a secondary battery 100, 200 according to an example embodiment of the present invention. FIG. 3A shows a can 140 at an initial stage of manufacture.

In the example shown in FIG. 3A, a substantially planar metal plate 140A having a uniform thickness may be provided using a blanking process and/or a notching process. In some examples, the metal plate 140A may include a substantially rectangular bottom portion 141 having long sides and short sides, long side portions 142 and 143 horizontally extended from the respective long sides of the bottom portion 141, and short side portions 144 and 145 horizontally extended from the bottom portion 141 and the respective long side portions 142 and 143. In some examples, one of the short side portions 144 may include a first short side portion 144a extended from the short side of the bottom portion 141 in a substantially triangular shape, a second short side portion 144b horizontally extended from an end of the long side portion 142, and a third short side portion 144c horizontally extended from an end of the long side portion 143. In an embodiment, the second short side portion 144b may include an inclined periphery located on a region facing the first short side portion 144a, and the third short side portion 144c may also include an inclined periphery located on a region facing the first short side portion 144a. In other words, the second and third short side portions 144b and 144c may be matched or corresponding with the first short side portion 144a. In an embodiment, the width of each of the long side portions 142 and 143 may be substantially equal to that of each of the long sides of the bottom portion 141. In an embodiment, the width of the first short side portion 144a may be substantially equal to that of each of the short sides of the bottom portion 141. In addition, the overall width of the second and third short side portions 144b and 144c may be substantially equal to the width of each of the short sides of the bottom portion 141. In addition, the length of each of the long side portions 142 and 143 may be substantially equal to that of each of the short side portions 144 and 145. In FIG. 3A, dashed lines indicate bending lines in a subsequent process to be described later.

In some examples, the metal plate 140A may include aluminum (Al), iron (Fe), copper (Cu), titanium (Ti), nickel (Ni), magnesium (Mg), chromium (Cr), manganese (Mn), zinc (Zn), or alloys of these elements. In some examples, the metal plate 140A may include nickel (Ni) plated iron (Fe) or SUS (e.g., SUS 301, SUS 304, SUS 305, SUS 316L, or SUS 321).

In some examples, the metal plate 140A may have a thickness in a range from approximately 0.1 mm to approximately 10 mm, and a deviation in the thickness of the metal plate 140A in all areas may be in a range from approximately 0.1% to approximately 1%. Therefore, embodiments of the present invention may provide the can 140 that is relatively thin and has a small thickness deviation, compared to a conventional can.

In some examples, the metal plate 140A may be preprocessed to facilitate a bending process and/or a welding process, which will be described below. In some examples, the metal plate 140A may be subjected to annealing treatment performed in a gas atmosphere (e.g., a predetermined gas atmosphere) and a temperature range (e.g., a predetermined temperature range) for a period of time (e.g., a predetermined period of time). In some examples, the annealing treatment may be performed in an atmosphere of inert gas, such as argon (Ar) or nitrogen ($N_2$) at a temperature range from approximately 300° C. to approximately 1000° C. for approximately 10 seconds to approximately 60 minutes. The annealing treatment may increase the elastic modulus of the metal plate 140A by approximately 5% to approximately 60%. Accordingly, the bending process of the metal plate 140A, which will later be described, may be easily performed, and occurrence of a spring-back phenomenon can be minimized or reduced, particularly after the bending process.

In an embodiment, the metal plate 140A may have a substantially planar top surface and a substantially planar bottom surface. In an embodiment, the top surface of the metal plate 140A may be subjected to insulation treatment. In some examples, a thin insulation film may be located on the top surface of metal plate 140A by forming a thin oxide layer (e.g., an anodizing layer) through a metal oxidation process or coating or laminating an insulation resin (e.g., polyimide, polypropylene, or polyethylene). In some examples, the top surface of the metal plate 140A may correspond to the interior surface of the can 140, and the bottom surface of the metal plate 140A may correspond to the exterior surface of the can 140. These features of the metal plate 140A may be commonly applied to all of the metal plates disclosed in the following embodiments.

FIG. 3B shows a can 140 at a later stage of manufacture. In the example shown in FIG. 3B, the metal plate 140A may be bent in a shape (e.g., a predetermined shape). In some examples, the metal plate 140A may be bent in a predetermined shape after it is fixed by a bending machine or a press mold.

In some examples, the long side portions 142 and 143 bent and extended from the respective long sides of the bottom portion 141 in a substantially perpendicular direction, and the short side portions 144 and 145 bent and extended from the bottom portion 141 and the long side portions 142 and 143 in a substantially perpendicular direction, may be provided as the result of the bending process. In an embodiment, the long side portions 142 and 143 may be bent approximately 90 degrees from the long sides of the bottom portion 141 to be extended, and the short side portions 144 and 145 may be bent approximately 90 degrees from the short sides of the bottom portion 141 to be extended and may be bent approximately 90 degrees from the long side portions 142 and 143 to be extended.

Therefore, the first short side portion 144a, the second short side portion 144b, and the third short side portion 144c may be positioned to face one another, and their peripheries may be matched and brought into contact with one another. In an embodiment, a vertex angle defined between the upper periphery of the first short side portion 144a and the short side of the bottom portion 141 may be in a range from approximately 40 degrees to approximately 50 degrees, and, in an embodiment, 45 degrees. In an embodiment, the vertex angle of the first short side portion 144a facing the second and third short side portions 144b and 144c may be in a range from approximately 80 degrees to approximately 100 degrees, and, in an embodiment, 90 degrees.

In an embodiment, an angle defined between each of two upper peripheries of the first short side portion 144a and the short side of the bottom portion 141 may be in a range from approximately 40 degrees to approximately 50 degrees, and, in an embodiment, 45 degrees, an angle defined between the periphery of the second short side portion 144b facing an end of a periphery of the first short side portion 144a and an end of the long side portion 142 may be in a range from approximately 40 degrees to approximately 50 degrees, and, in an embodiment, 45 degrees, and an angle defined between the periphery of the third short side portion 144c facing another end of the periphery of the first short side portion 144a and an end of the long side portion 143 may be in a range from approximately 40 degrees to approximately 50 degrees, and, in an embodiment, 45 degrees. Accordingly, a vertex at which the bottom portion 141, the end of the long side portion 142, the first short side portion 144a, and the second short side portion 144b meet, and a vertex at which the bottom portion 141, the end of the long side portion 143, the first short side portion 144a, and the third short side portion 144c meet, may be bent in a substantially round shape.

FIG. 3B shows an example in which the short side portions 144 and 145 are bent from the long side portions 142 and 143, respectively. That is, FIG. 3B shows an example in which the long side portions 142 and 143 have yet to be bent from the bottom portion 141.

FIG. 3C shows the can 140 at a later stage of manufacture. In the example shown in FIG. 3C, a welding process may be performed. In some examples, welding portions 146 may be provided in the short side portions 144 and 145. In some examples, the welding portions 146 may include a first welding portion 146a located at a boundary region between the first short side portion 144a and the second short side portion 144b, a second welding portion 146b located at a boundary region between the first short side portion 144a and the third short side portion 144c, and a third welding portion 146c located at a boundary region between the second short side portion 144b and the third short side portion 144c.

In other words, the first welding portion 146a may be at an acute angle with respect to a short side of the bottom portion 141 at a vertex, where the bottom portion 141, an end of the long side portion 142, and the first short side portion 144a meet, and the second welding portion 146b may be at an acute angle with respect to the short side of the bottom portion 141 at a vertex, where the bottom portion 141, the end of the long side portion 143, and the first short side portion 144a meet. In an embodiment, the third welding portion 146c may be extended from a bottom end of the second and third short side portions 144b and 144c to a top end (i.e., an opening 147) of the second and third short side portions 144b and 144c.

In some examples, the first and second welding portions 146a and 146b may be consecutively formed, and the third welding portion 146c may then be formed, or vice versa. In an embodiment, the welding process may be performed on the first welding portion 146a, the third welding portion 146c, and the second welding portion 146b in that order, or the welding order may be reversed. In addition, the welding process performed on the third welding portion 146c may be started from the bottom end and may be terminated at the top end, or vice versa. In some examples, the first, second, and third welding portions 146a, 146b, and 146c may include a butt joint structure, a lap joint structure, an overlay joint structure, or an edge joint structure. In some examples, the welding portions 146 may be in a substantially inverted Y-shaped ("A") configuration. The welding portions 146 may be provided to have a solid-line shape. Therefore, the first short side portion 144a may be securely fixed to the second and third short side portions 144b and 144c due to the first and second welding portions 146a and 146b, and the second and third short side portions 144b and 144c may be securely fixed to each other by the third welding portion 146c.

In an embodiment, the first and second welding portions 146a and 146b connected to each other may be shaped as straight lines having at least one vertex, and the third welding portion 146c may be shaped as a straight line extending from the vertex, where the first and second welding portions 146a and 146b meet, to the opening 147. In an embodiment, a vertex angle defined between the first welding portion 146a and the second welding portion 146b may be in a range from approximately 80 degrees to approximately 100 degrees, and, in an embodiment, 90 degrees. In an embodiment, an angle in a range from approximately 40 degrees to approximately 50 degrees, and, in an embodiment, 45 degrees, may be defined between the first welding portion 146a and the short side of the bottom portion 141, and an angle in a range from approximately 40 degrees to approximately 50 degrees, and, in an embodiment, 45 degrees, may be defined between the second welding portion 146b and the short side of the bottom portion 141.

As described above, one or more embodiments of the present invention provide the can 140 configured such that the first short side portion 144a is bent and extended from the bottom portion 141, the second and third short side portions 144b and 144c are bent and extended from the long side portions 142 and 143, and the first, second, and third short side portions 144a, 144b, and 144c are connected to one another through the first, second, and third welding portions 146a, 146b, and 146c to define a single short side portion 144, thereby providing the can 140 having increased bending and welding workability and improved sealing efficiency to prevent or substantially prevent leakage of electrolyte.

In an embodiment, since the first short side portion 144a is bent and extended from the corresponding bottom portion 141, a welding process is not necessarily performed between the bottom portion 141 corresponding to the first short side portion 144a and the first short side portion 144a. In addition, since the second and third short side portions 144b and 144c are bent and extended from the corresponding long side portions 142 and 143, respectively, a welding process is not necessarily performed between the long side portions 142 and 143 corresponding to the second and third short side portions 144b and 144c and the second and third short side portions 144b and 144c. These configurations may be commonly applied between the long side portions 142 and 143 and another short side portion 145.

In some examples, prior to formation of the welding portions 146, a temporary welding portion may first be provided at a boundary region between the first short side portion 144a and the second short side portion 144b, a boundary region between the first short side portion 144a and the third short side portion 144c, and/or a boundary region between the second short side portion 144b and the third short side portion 144c. In an embodiment, the temporary welding portion may include multiple temporary welding portions spaced apart from one another. In some examples, the temporary welding portions may be provided to have substantially dotted-line shapes. The temporary welding portions may prevent or substantially prevent a spring-back phenomenon from occurring to the long side portions 142 and 143, the short side portions 144 and 145, and the bottom portion 141. In addition, the temporary welding portions can securely fix the long side portions 142 and 143 and the short side portions 144 and 145 to each other. Accordingly, the main welding portions 146 (i.e., the welding portions 146) may be easily provided. The temporary welding portions may be provided by ultrasonic welding or resistance welding, as well as laser welding.

Figure 4A:
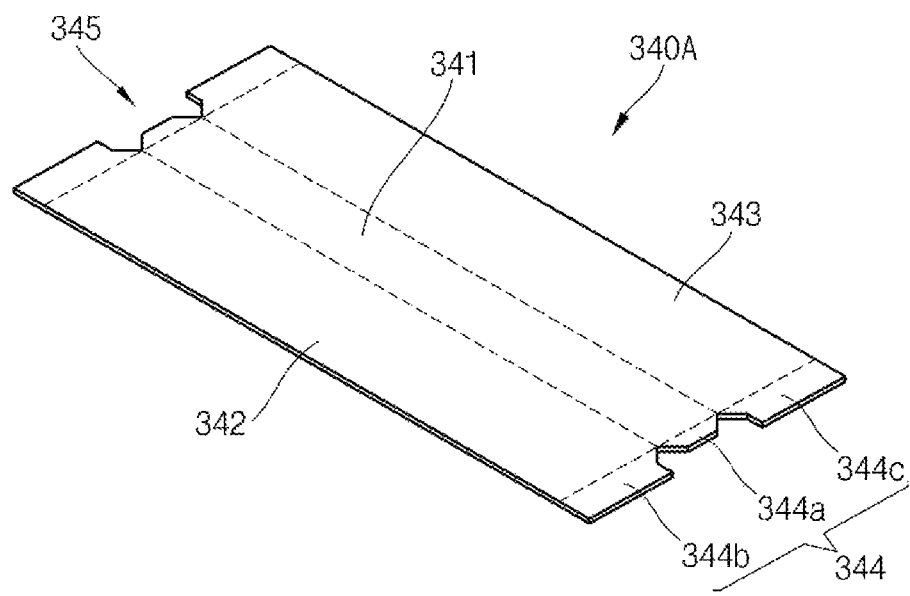
FIGS. 4A to 4C are perspective views illustrating a method for manufacturing a secondary battery according to an example embodiment of the present invention.
Figure 4B:
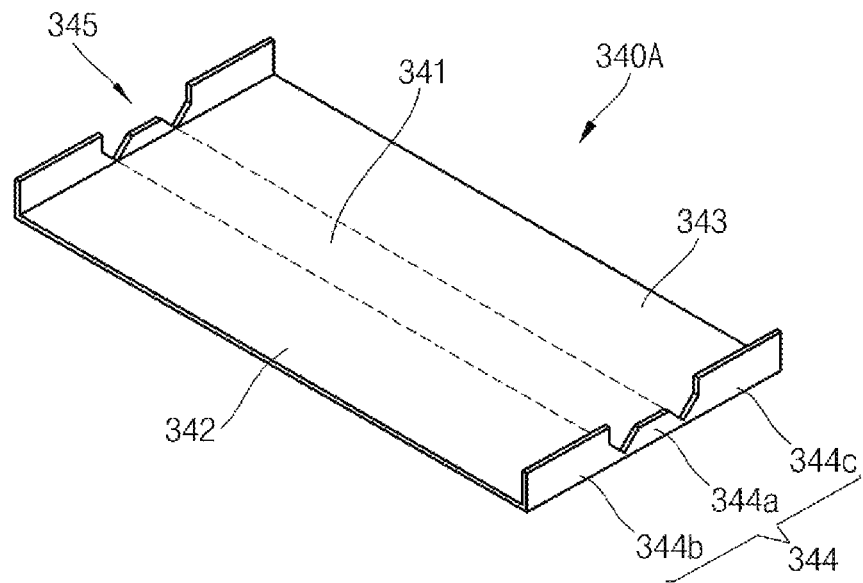
Figure 4C:
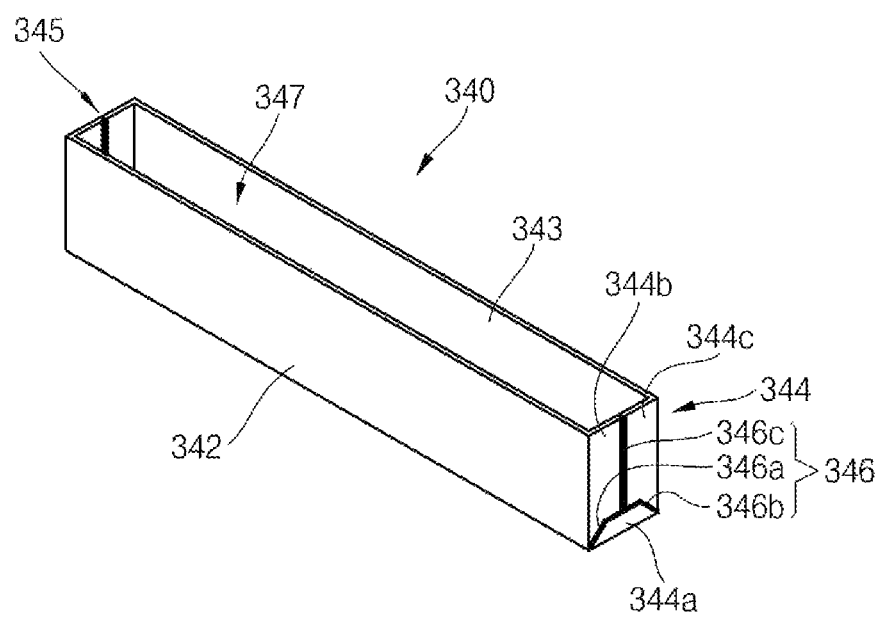

FIGS. 4A to 4C are perspective views illustrating a method for manufacturing a secondary battery 100, 200 according to an example embodiment of the present invention. FIG. 4A shows a can 340 at an initial stage of manufacture.

In the example shown in FIG. 4A, a substantially planar metal plate 340A having a uniform thickness may be provided using a blanking process and/or a notching process. In some examples, the metal plate 340A may include a substantially rectangular bottom portion 341 having long sides and short sides, long side portions 342 and 343 horizontally extended from the respective long sides of the bottom portion 341, and short side portions 344 and 345 horizontally extended from the bottom portion 341 and the respective long side portions 342 and 343. In some examples, one of the short side portions 344 may include a first short side portion 344a extended from the short side of the bottom portion 341 in a substantially trapezoidal shape, a second short side portion 344b horizontally extended from an end of the long side portion 342, and a third short side portion 344c horizontally extended from an end of the long side portion 343. Here, the second short side portion 344b may have a periphery inclined and bent at a region facing the first short side portion 344a, and the third short side portion 344c may also have a periphery inclined and bent at a region facing the first short side portion 344a. In an embodiment, widths of the long side portions 342 and 343 may be substantially equal to a width of the bottom portion 341. In an embodiment, widths of the short side portions 344 and 345 may be substantially equal to a width of each of the short sides of the bottom portion 341. In addition, the overall width of the second and third short side portions 344b and 344c may be substantially equal to the width of each of the short sides of the bottom portion 341. In addition, the length of each of the long side portions 342 and 343 may be substantially equal to that of each of the short side portions 344 and 345.

In this example, the first short side portion 344a bent and extended from the short side of the bottom portion 341 has a substantially trapezoidal shape, but it is to be understood by one skilled in the art that the first short side portion 344a may have a square or rectangular shape.

FIG. 4B shows the can 340 at a later stage of manufacture. In the example shown in FIG. 4B, the metal plate 340A may be bent in a shape (e.g., a predetermined shape). In some examples, the metal plate 340A may be bent in a predetermined shape after it is fixed by a bending machine or a press mold.

In some examples, the long side portions 342 and 343 bent and extended from the respective long sides of the bottom portion 341 in a substantially perpendicular direction, and the short side portions 344 and 345 bent and extended from the bottom portion 341 and the long side portions 342 and 343 in a substantially perpendicular direction, may be provided as the result of the bending process. That is, the long side portions 342 and 343 may be bent approximately 90 degrees from the long sides of the bottom portion 341 to be extended, and the short side portions 344 and 345 may be bent approximately 90 degrees from the short sides of the bottom portion 341 to be extended and may be bent approximately 90 degrees from the long side portions 342 and 343 to be extended. That is, the first short side portion 344a may be bent approximately 90 degrees from the short side of the bottom portion 341 to be extended, the second short side portion 344b may be bent approximately 90 degrees from an end of the long side portion 342 to be extended, and the third short side portion 344c may be bent approximately 90 degrees from an end of the long side portion 343 to be extended. Therefore, the first short side portion 344a, the second short side portion 344b, and the third short side portion 344c may be positioned to face one another and their peripheries may contact one another. In an embodiment, an angle defined between the periphery of the first short side portion 344a and the short side of the bottom portion 341 may be in a range from approximately 40 degrees to approximately 50 degrees, and, in an embodiment, 45 degrees. FIG. 4B shows an example in which the short side portions 344 and 345 are bent from the long side portions 342 and 343.

FIG. 4C shows the can 340 at a later stage of manufacture. In the example shown in FIG. 4C, a welding process may be performed. In some examples, welding portions 346 may be provided in the short side portions 344 and 345. In some examples, the welding portions 346 may include a first welding portion 346a located at a boundary region between the first short side portion 344a and the second short side portion 344b, a second welding portion 346b located at a boundary region between the first short side portion 344a and the third short side portion 344c, and a third welding portion 346c located at a boundary region between the second short side portion 344b and the third short side portion 344c.

In an embodiment, the first welding portion 346a may be at an acute angle with respect to the short side of the bottom portion 341 at a vertex, where the bottom portion 341, an end of the long side portion 342 and the first short side portion 344a meet, and may be extended to be bent, and the second welding portion 346b may be at an acute angle with respect to the short side of the bottom portion 341 at a vertex, where the bottom portion 341, an end of the long side portion 343, and the first short side portion 344a meet, and may be extended to be bent. In an embodiment, the third welding portion 346c may be extended from bottom ends of the second and third short side portions 344b and 344c to top ends (i.e., an opening 347) of the second and third short side portions 344b and 344c. In some examples, the first and second welding portions 346a and 346b may be consecutively formed, and the third welding portion 346c may then be formed, or vice versa. In addition, the welding process performed on the third welding portion 346c may be started from a bottom end of the third welding portion 346c and may be terminated at the top end, or vice versa. In some examples, the first, second, and third welding portions 346a, 346b, and 346c may include a butt joint structure, a lap joint structure, an overlay joint structure, or an edge joint structure. In some examples, the welding portions 346 may be in a substantially "A" shaped configuration. In an embodiment, the welding portions 346 may overlap with temporary welding portions and may be shaped as solid lines. Therefore, the first short side portion 344a may be securely fixed to the second and third short side portions 344b and 344c by the first and second welding portions 346a and 346b, and the second and third short side portions 344b and 344c may be securely fixed to each other by the third welding portion 346c. In an embodiment, the first and second welding portions 346a and 346b may be shaped as straight lines having at least two vertices, and the third welding portion 346c may be shaped as a straight line extending from a side where the first and second welding portions 346a and 346b meet to the opening 347.

Here, since the first short side portion 344a is bent and extended from the corresponding bottom portion 341, a welding process is not necessarily performed between the bottom portion 341 corresponding to the first short side portion 344a and the first short side portion 344a. In addition, since the second and third short side portions 344b and 344c are bent and extended from the corresponding long side portions 342 and 343, respectively, a welding process is not necessarily performed between the long side portions 342 and 343 corresponding to the second and third short side portions 344b and 344c and the second and third short side portions 344b and 344c.

In some examples, prior to formation of the welding portions 346, temporary welding portions may first be provided at a boundary region between the first short side portion 344a and the second short side portion 344b, a boundary region between the first short side portion 344a and the third short side portion 344c, and/or a boundary region between the second short side portion 344b and the third short side portion 344c. The temporary welding portions may prevent or substantially prevent a spring back phenomenon from occurring to the long side portions 342 and 343, the short side portions 344 and 345, and the bottom portion 341. In addition, the temporary welding portions can securely fix the long side portions 342 and 343 and the short side portions 344 and 345 to each other. Accordingly, the main welding portions 346 (i.e., the welding portions 346) may be easily provided.

FIGS. 5A to 5D are partial perspective views illustrating cans 440, 540, 640, and 740 included in a secondary battery according to example embodiments of the present invention.

Figure 5A:
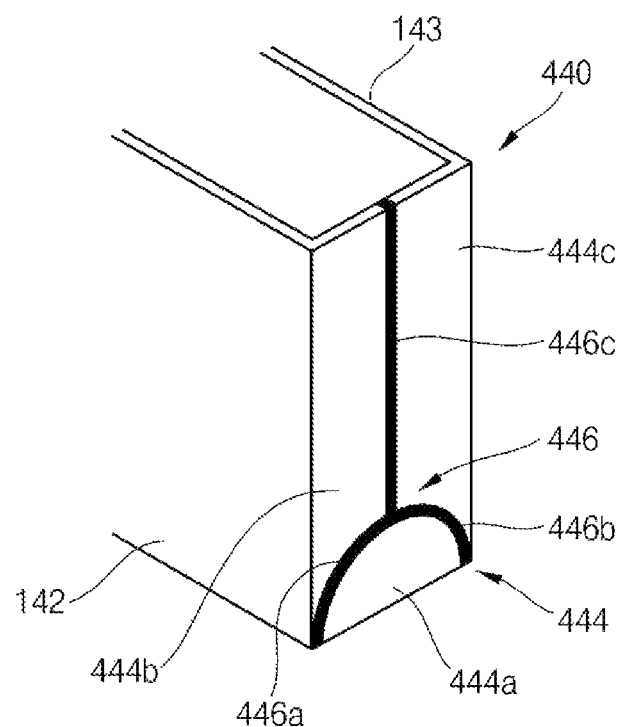
FIGS. 5A to 5D are partial perspective views illustrating a method for manufacturing a secondary battery according to an example embodiment of the present invention.

As shown in FIG. 5A, short side portions 444 of the can 440 may include a first short side portion 444a bent and extended from the bottom portion 141 in a substantially semicircular shape, a second short side portion 444b bent and extended from an end of the long side portion 142, and a third short side portion 444c bent and extended from an end of the long side portion 143. Here, the second short side portion 444b and the third short side portion 444c may have peripheries matched with the substantially semicircular first short side portion 444a. The first, second, and third short side portions 444a, 444b, and 444c may be integrally formed by welding portions 446 to define a single short side portion 444. In some examples, the welding portions 446 may include a first welding portion 446a located at a boundary region between the first short side portion 444a and the second short side portion 444b, a second welding portion 446b located at a boundary region between the first short side portion 444a and the third short side portion 444c, and a third welding portion 446c located at a boundary region between the second short side portion 444b and the third short side portion 444c. Here, the first and second welding portions 446a and 446b may have a substantially semicircular shape, and the third welding portion 446c may be shaped as a straight line extending from a region where the first and second welding portions 446a and 446b meet to a top opening of the can 440.

Figure 5B:
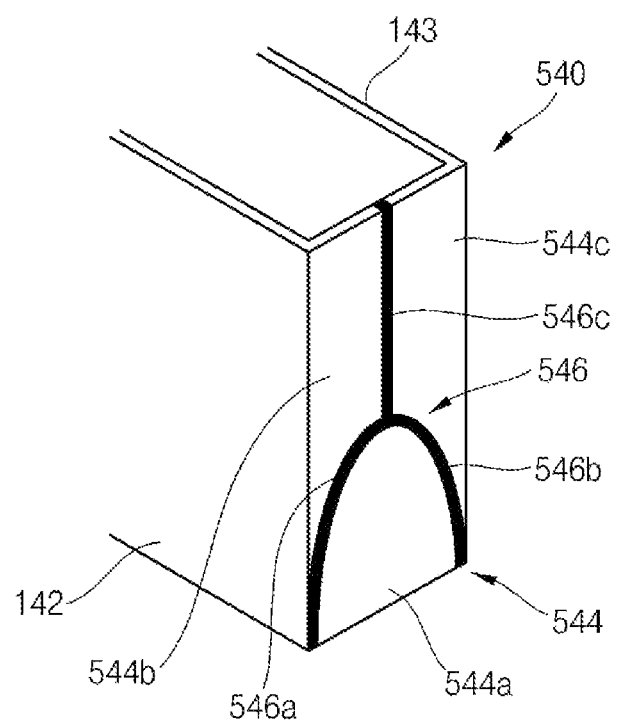

As shown in FIG. 5B, short side portions 544 of the can 540 may include a substantially vertically semi-elliptical first short side portion 544a bent and extended from the bottom portion 141, a second short side portion 544b bent and extended from an end of the long side portion 142, and a third short side portion 544c bent and extended from an end of the long side portion 143. Here, the second short side portion 544b and the third short side portion 544c may have peripheries matched with the substantially vertically semi-elliptical first short side portion 544a. The first, second, and third short side portions 544a, 544b, and 544c may be integrally formed by welding portions 546 to define a single short side portion 544. In some examples, the welding portions 546 may include a first welding portion 546a located at a boundary region between the first short side portion 544a and the second short side portion 544b, a second welding portion 546b located at a boundary region between the first short side portion 544a and the third short side portion 544c, and a third welding portion 546c located at a boundary region between the second short side portion 544b and the third short side portion 544c. Here, the first and second welding portions 546a and 546b may have a substantially vertically semi-elliptical shape, and the third welding portion 546c may be shaped as a straight line extending from a region where the first and second welding portions 546a and 546b meet to a top opening of the can 540. Here, the vertically semi-elliptical shape means that the major axis of an ellipse extends in a vertical direction.

Figure 5C:
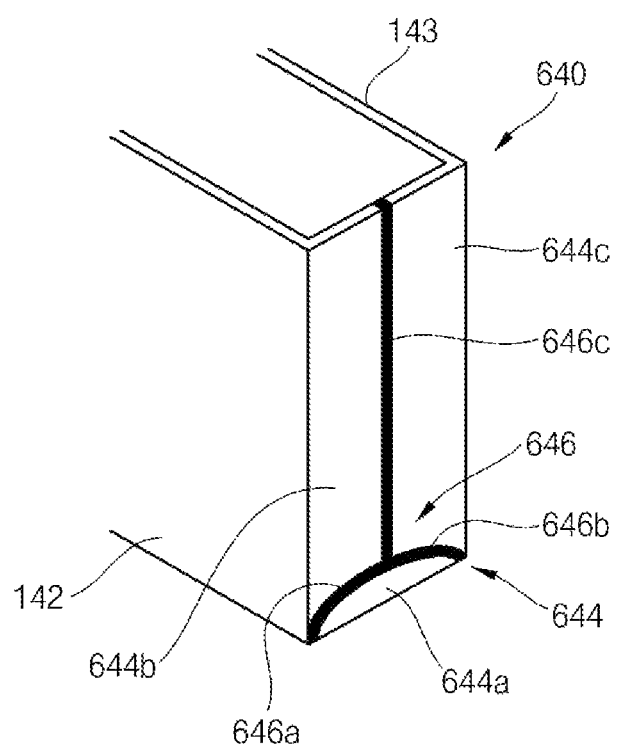

As shown in FIG. 5C, short side portions 644 of the can 640 may include a substantially horizontally semi-elliptical first short side portion 644a bent and extended from the bottom portion 141, a second short side portion 644b bent and extended from an end of the long side portion 142, and a third short side portion 644c bent and extended from an end of the long side portion 143. Here, the second short side portion 644b and the third short side portion 644c may have peripheries matched with the substantially horizontally semi-elliptical first short side portion 644a. The first, second, and third short side portions 644a, 644b, and 644c may be integrally formed by welding portions 646 to define a single short side portion 644. In some examples, the welding portions 646 may include a first welding portion 646a located at a boundary region between the first short side portion 644a and the second short side portion 644b, a second welding portion 646b located at a boundary region between the first short side portion 644a and the third short side portion 644c, and a third welding portion 646c located at a boundary region between the second short side portion 644b and the third short side portion 644c. Here, the first and second welding portions 646a and 646b may have a substantially horizontally semi-elliptical shape, and the third welding portion 646c may be shaped as a straight line extending from a region where the first and second welding portions 646a and 646b meet to a top opening of the can 640. Here, the horizontally semi-elliptical shape means that the major axis of an ellipse extends in a horizontal direction.

Figure 5D:
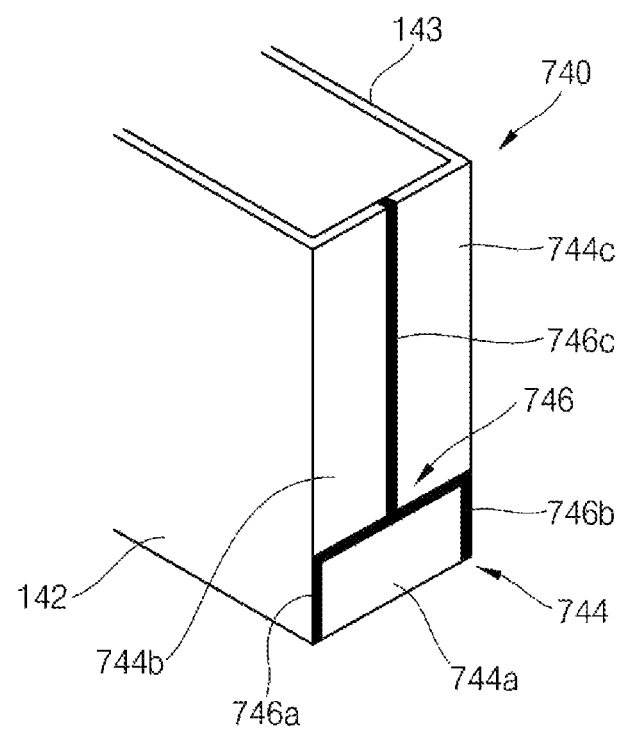

As shown in FIG. 5D, short side portions 744 of the can 740 may include a substantially quadrangular (rectangular or square) first short side portion 744a bent and extended from the bottom portion 141, a second short side portion 744b bent and extended from an end of the long side portion 142, and a third short side portion 744c bent and extended from an end of the long side portion 143. Here, the second short side portion 744b and the third short side portion 744c may have peripheries matched or corresponding with the substantially quadrangular first short side portion 744a. The first, second, and third short side portions 744a, 744b, and 744c may be integrally formed by welding portions 746 to define a single short side portion 744. In some examples, the welding portions 746 may include a first welding portion 746a located at a boundary region between the first short side portion 744a and the second short side portion 744b, a second welding portion 746b located at a boundary region between the first short side portion 744a and the third short side portion 744c, and a third welding portion 746c located at a boundary region between the second short side portion 744b and the third short side portion 744c. Here, the first and second welding portions 746a and 746b may have a substantially quadrangular shape (e.g., three sides of a quadrangle), and the third welding portion 746c may be shaped as a straight line extending from a region where the first and second welding portions 746a and 746b meet to a top opening of the can 740.

In addition, the first welding portion 746a may be provided at a boundary region between an end of the long side portion 142 and the first short side portion 744a and a boundary region between the first short side portion 744a and the second short side portion 744b, and the second welding portion 746b may be provided at a boundary region between an end of the long side portion 143 and the first short side portion 744a and a boundary region between the first short side portion 744a and the third short side portion 744c. In an embodiment, the regions of the first and second welding portions located at the boundary region between the end of the long side portion 142 and the first short side portion 744a and a boundary region between the end of the long side portion 143 and the first short side portion 744a may include an edge joint structure.

Figure 6:
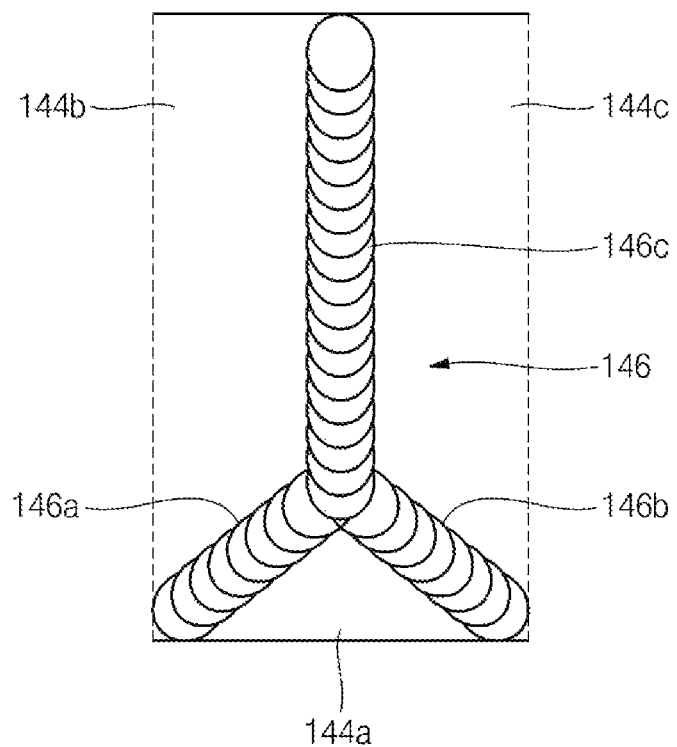
FIG. 6 is a plan view illustrating a configuration of a welding portion provided in a can of a secondary battery according to an example embodiment of the present invention.

FIG. 6 is a plan view illustrating a configuration of welding portions 146 provided in the can 140 of the secondary battery 100, 200 according to an example embodiment of the present invention. In some examples, the welding portions 146 may include multiple welding beads. The multiple welding beads may overlap with one another from the bottom portion 141 of the can 140 to the opening 147 (i.e., the cap assembly 150). That is, since laser beams move from the bottom portion 141 of the can 140 to the opening 147 (that is, from the bottom ends to the top ends of the short side portions 144a and 144b), circular peripheries of the multiple welding beads may face substantially bottom ends (i.e., the bottom portion 141). In such a manner, the welding portions 146 include the multiple overlapping welding portions, such that pin holes, blow holes, and/or worm holes may not be located in the welding portions 146. In some examples, since the welding portions 146 are located to face the bottom portion 141 of the can 140 from the opening 147 of the can 140, the circular peripheries of the multiple welding beads may face substantially top ends (i.e., the opening 147).

FIGS. 7A to 7E are cross-sectional views illustrating configurations of welding portions provided in the can of the secondary battery 100, 200 according to example embodiments of the present invention.

Figure 7A:
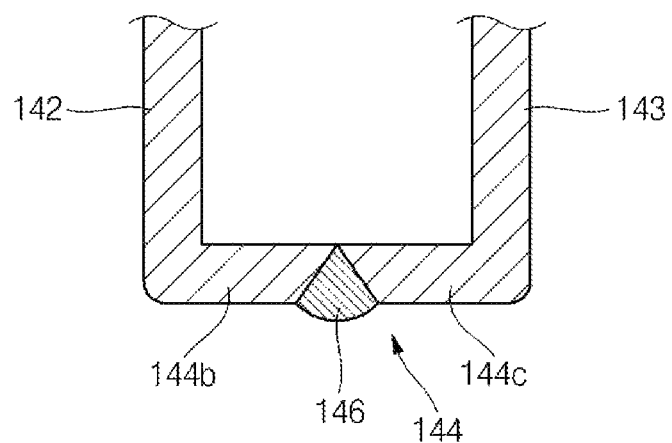
FIGS. 7A to 7E are cross-sectional views illustrating configurations of welding portions provided in a can of a secondary battery according to example embodiments of the present invention.

In the example shown in FIG. 7A, a welding portion 146 may be provided between a second short side portion 144b extended from an end of a long side portion 142 and a third short side portion 144c extended from an end of a long side portion 143. The welding portion 146 may include a butt joint structure. That is, the welding portion 146 may be provided in a butted state in which an end of the second short side portion 144b is matched with an end of the third short side portion 144c to be brought into contact with each other. In an embodiment, the welding portion 146 may be provided not only outside but also inside (i.e., inside of the can 140).

Figure 7B:
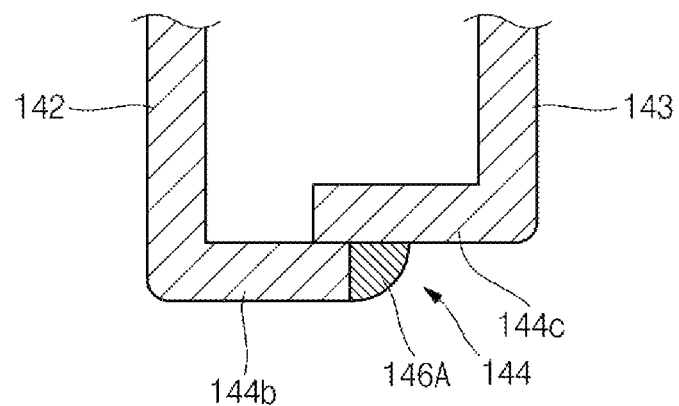

In the example shown in FIG. 7B, a welding portion 146A may be provided between the second short side portion 144b extended from an end of the long side portion 142 and the third short side portion 144c extended from an end of the long side portion 143. The welding portion 146A may include a lap joint structure. That is, the welding portion 146A may be provided in a state in which the second short side portion 144b and the third short side portion 144c overlap with each other. In an embodiment, the welding portion 146A may be provided not only outside but also inside (i.e., inside of the can 140).

Figure 7C:
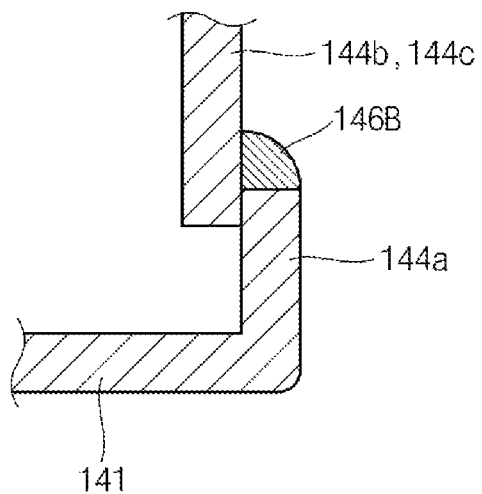

In the example shown in FIG. 7C, a welding portion 146B may be provided between the first short side portion 144a extended from the bottom portion 141 and the second, third short side portion 144b, 144c. The welding portion 146B may include a lap joint structure. That is, the welding portion 146B may be provided in a state in which the first short side portion 144a and the second, third short side portion 144b, 144c overlap with each other. Here, the first short side portion 144a may overlap with the second, third short side portion 144b, 144c from an exterior surface of the second, third short side portion 144b, 144c. In an embodiment, the welding portion 146B may be provided not only outside but also inside (i.e., inside of the can 140).

Figure 7D:
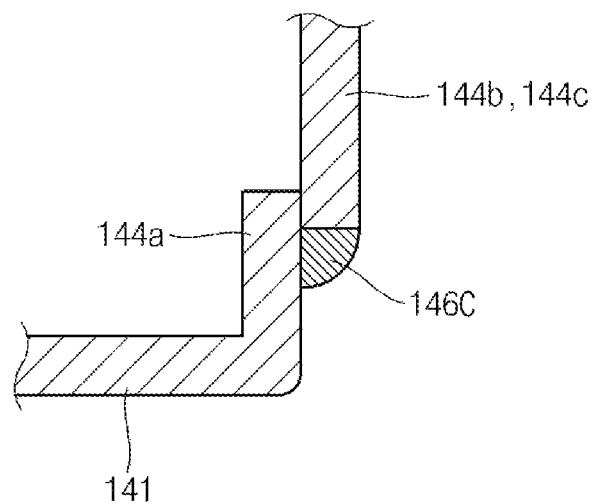

In the example shown in FIG. 7D, a welding portion 146C may be provided in a state in which the first short side portion 144a overlaps with an interior surface of the second, third short side portion 144b, 144c. In an embodiment, the welding portion 146C may be provided not only outside but also inside (i.e., inside of the can 140).

Figure 7E:
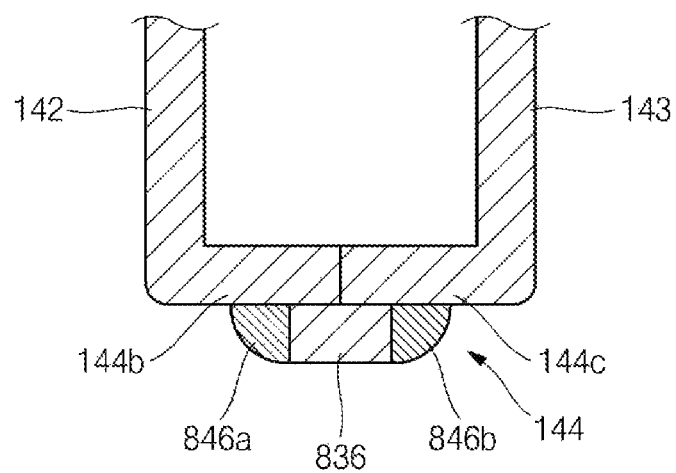

In the example shown in FIG. 7E, welding portions 846a and 846b may be provided between the second short side portion 144b extended from an end of the long side portion 142 and the third short side portion 144c extended from an end of the long side portion 143. The welding portions 846a and 846b may include a single-side overlay joint structure having a cover plate 836. In an embodiment, the welding portions 846a and 846b may be provided not only outside but also inside (i.e., inside of the can 140). Therefore, the welding portions 846a and 846b may also include double-side overlay joint structure.

As described above, the can according to embodiments of the present invention may include a wide variety of joint structures for welding portions, and the can may have improved sealing efficiency to prevent or substantially prevent leakage of electrolyte.

Although the welding structures of the boundary region between the second short side portion 144b and the third short side portion 144c have been mainly described, one skilled in the art will readily understand that they may be commonly applied to a boundary region between the first short side portion 144a and the second short side portion 144b and a boundary region between the first short side portion 144a and the third short side portion 144c.

While the secondary battery of the present invention has been particularly shown and described with reference to some example embodiments thereof, it will be understood by those of ordinary skill in the art that various changes in form and details may be made therein without departing from the spirit and scope of the present invention as set forth by the following claims.

What is claimed is:

1. A secondary battery comprising:
    an electrode assembly;
    a case accommodating the electrode assembly and including an opening at an upper side of the case; and
    a cap assembly directly coupled to the case to seal the opening,
    wherein the case is formed of a metal plate and comprises a bottom portion, long side portions bent and extended from the bottom portion in a direction toward the cap assembly, a first short side portion bent and extended from the bottom portion in the direction toward the cap assembly, and second short side portions bent and extended from the long side portions, the first short side portion and the second short side portions are connected to one another to define a short side portion, and an entirety of the first short side portion extending from the bottom portion to the second short side portions has a planar shape, the bottom portion, the long side portions, and the short side portion defining respective portions of an exterior of the secondary battery, wherein a peripheral edge of the first short side portion extends away from a long side portion of the long side portions, and a peripheral edge of a second short side portion of the second short side portions extends away from the long side portion of the long side portions so as to correspond to the peripheral edge of the first short side portion, the first short side portion and the second short side portion of the second short side portions being welded to each other along lengths of the peripheral edges thereof that correspond to each other, wherein welding portions are not provided on the bottom portion, wherein the short side portion comprises welding portions, and the welding portions comprise a first welding portion located between the first short side portion and the second short side portions, and a second welding portion located between the second short side portions and extending to the opening in a straight line shape, an end of the second welding portion corresponding to an end of the first welding portion, wherein a welding portion of the welding portions comprises multiple welding beads, and the multiple welding beads face the bottom portion such that, in a direction from the cap assembly toward the bottom portion, a bottom periphery of each of the multiple welding beads overlaps another welding bead of the multiple welding beads, wherein the welding portions are provided at an outer side and an inner side of the short side portion.

2. The secondary battery of claim 1, wherein the planar shape of the first short side portion has a shape of a triangle, a rectangle, a trapezoid, a semicircle, or a semi-ellipse, and the second short side portions are configured to correspond with the first short side portion.

3. The secondary battery of claim 1, wherein the second short side portions are connected to each other.

4. The secondary battery of claim 1, wherein the first welding portion and the second welding portion are connected to each other.

5. The secondary battery of claim 1, wherein the first welding portion is shaped as a straight line having at least one vertex, and the second welding portion is shaped as a straight line extending from the first welding portion.

6. The secondary battery of claim 5, wherein the first welding portion has a vertex angle in a range from 80 degrees to 100 degrees.

7. The secondary battery of claim 5, wherein the second welding portion is extended from a vertex or a side of the first welding portion.

8. The secondary battery of claim 1, wherein the first welding portion is shaped as a curve, and the second welding portion is shaped as a straight line extending from the first welding portion.

9. The secondary battery of claim 1, wherein a welding portion of the welding portions comprises a butt joint structure, a lap joint structure, an overlay joint structure, or an edge joint structure.

10. The secondary battery of claim 9, wherein the butt joint structure is configured to provide the welding portion in a state in which an end of the first short side portion and an end of the second short side portions are in contact with each other.

11. The secondary battery of claim 9, wherein the lap joint structure is configured to provide the welding portion in a state in which the first short side portion and the second short side portions overlap with each other.

12. The secondary battery of claim 9, wherein the overlay joint structure is configured to provide the welding portion in a state in which a cover plate is attached to the first short side portion and the second short side portions.

13. The secondary battery of claim 1, wherein the multiple welding beads comprise circular peripheries facing the bottom portion.

14. The secondary battery of claim 1, wherein the first short side portion extends from both end portions of the bottom portion, the second short side portions extend from both ends of the long side portions, and the short side portion is defined on both sides of the bottom portion and the long side portions.

* * * * *